United States Patent [19]

Zarouri et al.

[11] Patent Number: 5,321,882
[45] Date of Patent: Jun. 21, 1994

[54] SLIDER FABRICATION

[75] Inventors: Mourad D. Zarouri, San Diego; Steven J. Plewes; Gerald G. Lopatin, both of San Jose, all of Calif.

[73] Assignee: Dastek Corporation, San Jose, Calif.

[21] Appl. No.: 949,297

[22] Filed: Sep. 22, 1992

[51] Int. Cl.$^5$ .................................. G11B 5/42
[52] U.S. Cl. .............................. 29/603; 29/423; 29/559
[58] Field of Search ............... 29/603, 559, 423; 360/103, 104

[56] References Cited

U.S. PATENT DOCUMENTS

4,939,837 7/1990 Krounbi ........................ 29/603
5,095,613 3/1992 Hussinger et al. ............... 29/603

Primary Examiner—Carl E. Hall
Attorney, Agent, or Firm—Skjerven, Morrill, MacPherson, Franklin & Friel

[57] ABSTRACT

A process for producing air bearing sliders for thin film magnetic heads, one at a time from a strip of material having the thin film heads aligned in a column. The thin film heads are aligned within the column such that the slider processing is performed in a direction substantially parallel to the orientation of the column. In one embodiment, a mechanical backing, fixture or substrate provides structural rigidity to the strip of material having the sliders while undergoing mechanical processing, such as lapping.

26 Claims, 7 Drawing Sheets

SLIDER FABRICATION

BACKGROUND OF THE INVENTION

1. Field of the Invention

This invention relates to process for the manufacturer of air bearing sliders including transducers, and more particularly to a process for producing air bearing sliders from a wafer which includes a plurality of transducers.

2. Description of the Prior Art

Figure 6:
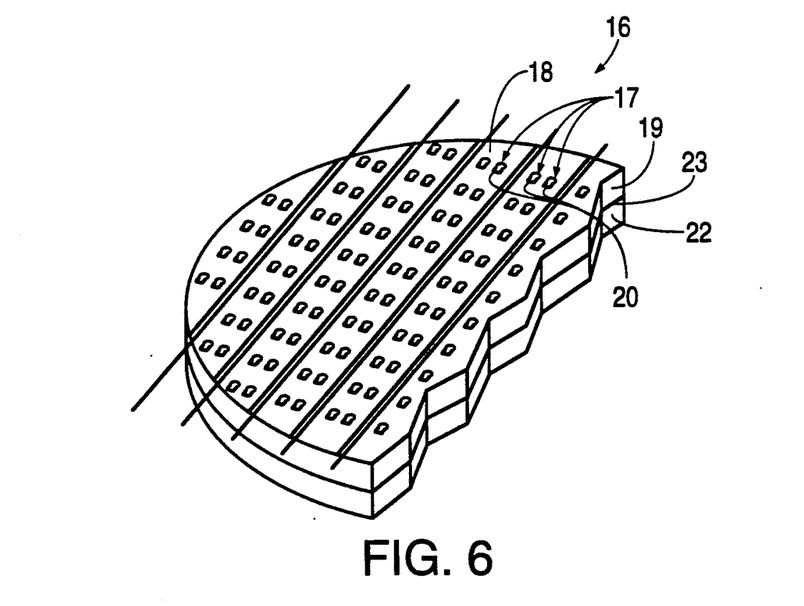
FIG. 6 is a perspective portion of a wafer having a plurality of transducer elements on one surface, and having a substrate affixed to another surface.

In the prior art, methods of producing sliders with thin film read/write heads have followed a technique such as that illustrated in U.S. Pat. No. 5,095,613 to Hussinger et al., issued Mar. 17, 1992. The process in Hussinger begins, in one embodiment with a wafer on which a plurality of read/write transducers have been manufactured. From the wafer a row of transducers are sliced and the row is glued to a fixture. Or alternatively, the wafer is glued to a fixture, such as illustrated in the embodiment disclosed in FIG. 7, leaving a row of transducers exposed and available for processing. The row of transducers are all simultaneously lapped to provide the appropriate throat height for the transducers. In a prior art process described and illustrated in Hussinger et al., and more particularly the process of FIGS. 6, 6a and 6b in Hussinger et al., a row of transducers is removed from a wafer and the row of transducers is processes simultaneously. One of the problems with the foregoing processes which utilize a row-processing technique is that because of a bowing of the row of transducers, a non-uniform throat height from end-to-end of the row results. This phenomenon is referred to as row bow. The resulting heads across the row have varying throat heights, which results in magnetic transducers having non-uniform electrical characteristics. The read/write electrical characteristics of a magnetic transducer varies substantially as a result of a variation of throat height and accordingly with a non-uniform throat height of the devices the electrical characteristics of magnetic heads produced by the row processing technique can widely vary. If read/write transducers having a small margin of error from transducer-to-transducer in regard to their electrical characteristics are required, then the variations in the characteristics from transducer-to-transducer produced by the row process may require that a high percentage of the devices be discarded, resulting in unacceptably low yield.

Figure 1:
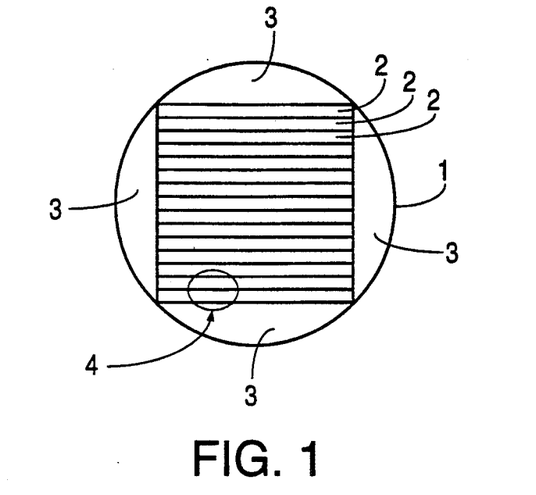
FIG. 1 is a top plan view of a wafer with transducer elements formed on the surface, with the elements aligned in rows.

Conventional, row-oriented slider fabrication processes separate by a row at a time sliders which have been formed on the surface of a wafer. For example, referring to FIG. 1, wafer 1 includes a plurality of rows 2 in which heads (not shown) are formed in a alignment across the row. All heads on the row must be colinear, that is oriented in a straight line in order for them to have equal throat heights when the row of heads are processed in a method such as that illustrated in the Hussinger et al. patent. The requirement that all heads in a row be colinear places a constraint on the wafer layout. More particularly, all heads must be arranged in rectangular arrays such that all rows are of equal length for batch processing. If a square wafer is utilized, then the layout is straight forward since the rows may be made the width of the wafer. However, it is preferable to use a round wafer since it is easier to coat evenly with photoresist. As will be appreciated from reference to FIG. 1, the rectangular array constraint results in a significant loss of usable are of the wafer since those areas indicated at 3 will not include heads. Thus this loss of area reduces the number of sliders which may be manufactured per processed wafer, hence increasing the cost of the heads. The unusable area may be as much as 50% of the wafers, total area, resulting in considerable waste. Additionally, this colinearity requirement also places constraints on the wafer-level element fabrication process, especially the photolithography process. When the sliders which are being manufactured utilize thin film heads, 1× projection and lithography, and step and repeat lithography are commonly used. Both are affected by the colinearity requirements. For 1× projection processes, the mask must be precisely made so that each rows' elements line up within hundredths of a micron, which increases the cost of the mask. Additionally, the distortion of the exposure process must also be tightly controlled.

Figure 2:
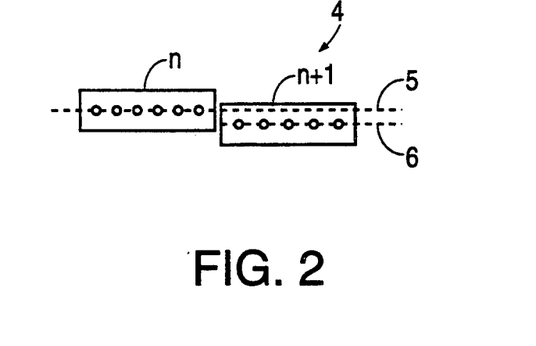
FIG. 2 is an enlarged view of a portion of one row of transducer elements illustrated in FIG. 1.
Figure 3:
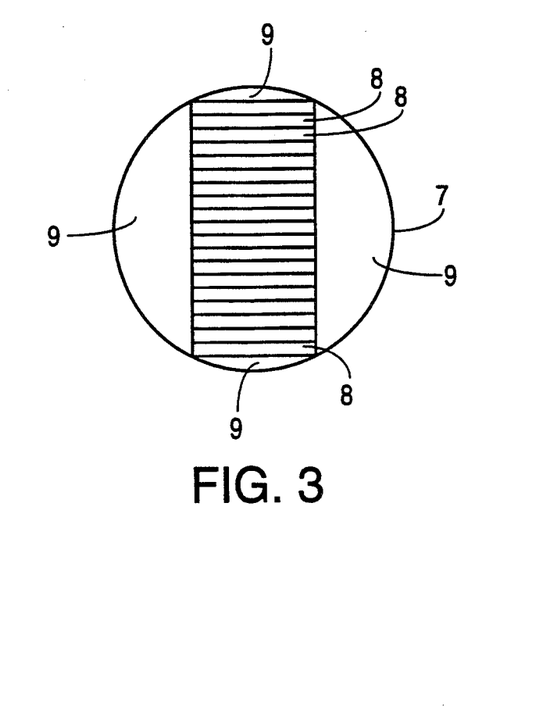
FIG. 3 is a top plan view of a wafer having a plurality of rows of transducer elements formed on a surface.

If a step-and-repeat process is used to define the transducer elements, additional colinearity implications are encountered which are more onerous than those encountered with the precision required for the mask. Alignment between stepped fields is typically only achievable within tenths of a micron. Thus splitting a row across two or more fields can result in a shift in throat height. This is illustrated in FIG. 2 where a highly magnified view of portion 4 of wafer 1 is illustrated. In FIG. 2, in field "n" transducer elements are indicated by circles and the centerline of those elements is indicated by dashed line 5. Similarly, the transducer elements in field n+1 are indicated by circles and the centerline of those elements indicated by dashed line 6. As will be appreciated by reference to FIG. 2, the difference in distance between lines 5 and 6 illustrate the misalignment and lack of colinearity. When the row containing these misaligned portions is processed on the row-basis, an unacceptable variation in throat height will result. One possible solution to this misalignment where a plurality of fields are used in a row is to avoid this by having an entire row contained in a single field. This however limits the size of the row since stepper lithographic fields are limited in size, and therefore limiting the row lengths to the field size can limit the utilization to the wafer. For example, referring to FIG. 3, wafer 7 is illustrated, with the wafer having a plurality of fields indicated at 8. The width of the field (and accordingly the length or the row) is limited by the field size and therefore further inefficiency results since unusable areas 9 are left. The layout in FIG. 3 is not optimum because it requires may more fields to be printed.

Figure 4:
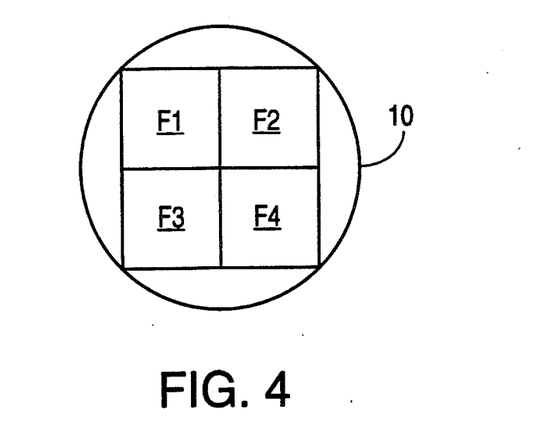
FIG. 4 is a top plan view of a wafer having fields of transducer elements formed on a surface.

An optimum layout would be one such as that illustrated in FIG. 4 in which four fields are utilized to more efficiently cover the surface of wafer 10. The fields in FIG. 4 are denoted by F1, F2, F3 and F4. From the above, it will be appreciated that the processing on a row by row basis makes the stepper lithography less efficient and more expensive.

SUMMARY OF THE INVENTION

An object of the present invention is to produce sliders having uniform and consistent electrical characteristics by totally eliminating the row bow.

In accordance with the present invention, sliders including read/write transducers are manufactured from a wafer which includes a plurality of read/write transducers arranged in rows and columns. In accordance with the invention, sliders are advantageously produced by severing columns, and not rows, of read/- write transducers from the wafer and processing the column to produce sliders one at a time from the column. The transducers in the column of transducers have their pole pieces positioned generally along a longitudinal direction of the strip of material which has been removed from the wafer.

BRIEF DESCRIPTIONS OF THE DRAWINGS

Other objects and advantages of the invention will become apparent from a study of the specification and drawings in which.

DETAILED DESCRIPTION OF THE INVENTION

The process in accordance with the present invention will be illustrated in connection with the manufacture of an air bearing slider having a pair of transducers, one associated with each rail of a two-rail air bearing slider. However, the process may be utilized to manufacture air bearing sliders having other than two rails and is not limited to a process in which a transducer is associated with each of the rails of the slider.

The column process described in detail with below alleviates all of the limitations of the prior art which have been described above. One of the advantages of the column process is that the wafer can be layed out without regard to rectangular arrays and the entire wafer can be utilized since columns can be of arbitrary lengths. For example, referring to FIG. 5, it will be appreciated that on wafer 16 (which is partially shown) the entire surface may be filled with transducers 17 and there is no loss of space. Secondly, no expensive and precise masks are needed since the process automatically adjusts for small variations in positions, and the throat height of the devices is not affected. Additionally, by processing the wafer on a column basis, the sensitivity to variation in alignments from field to field (such as illustrated in FIG. 2) is not of concern. Accordingly, any size stepper field can be utilized. Furthermore, the extra "zero" or base alignment layer is not required. Ordinary steppers with blind stepping accuracy are sufficient for use in manufacturing air bearing sliders when the process of the present invention is utilized.

Figure 5:
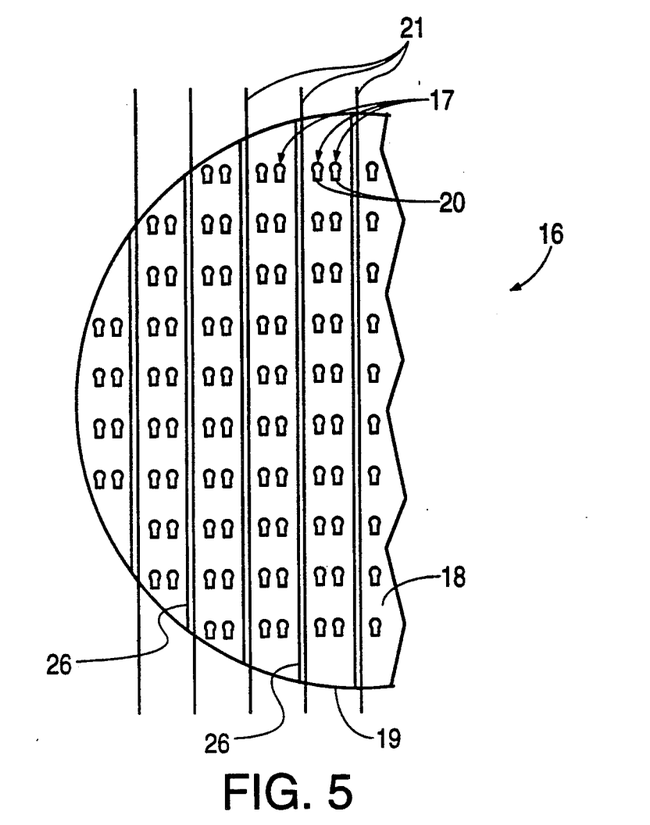
FIG. 5 is a top plan view of a portion of a wafer including a plurality of transducer elements formed on one surface thereof.

Referring to FIG. 5, a portion of a wafer 16 having a plurality of transducers indicated at 17 is shown in a top plan view. Transducers 17 may be of the thin film head type which are formed on surface 18 the body of material such as titanium carbide or other suitable material for producing an air bearing slider. As illustrated in FIG. 5, transducers 17 are aligned in rows with the pole portions indicated at 20 facing in the same direction, and as illustrated in FIG. 5 a downward direction. Lines 21 illustrate the columnar alignment.

The process for producing air bearing sliders in accordance with the present invention begins with severing from wafer 16 strips of the wafer which provide columns of transducers. The strips are severed along lines 21 in FIG. 5, and processing the strip of material containing the column of transducers proceeds to produce on a one-at-a-time basis air bearing sliders. In accordance with one embodiment of the present invention, the wafer is sliced into strips of material along the columnar basis and each strip of material is processed to produce an air bearing slider which is then severed from the strip, and successive transducers are processed and turned into air bearing sliders. In one embodiment, the processing of a strip of material from wafer 16 may be performed on a strip without a backing or fixture, however in another embodiment, the process includes the addition of a support surface to the wafer. More particularly, referring to FIG. 6, fixture 22 of a suitable material for adding structural rigidity to wafer 16 is affixed to the underside 23 of body of material 19. One process for affixing fixture 22 onto body 19 is to utilize an adhesive which may be removed by solvents after the air bearing sliders are manufactured. Alternatively, and preferably, fixture 22 is clamped to body 19, or to a strip severed from body 19, to support the strip during processing.

Figure 6A:
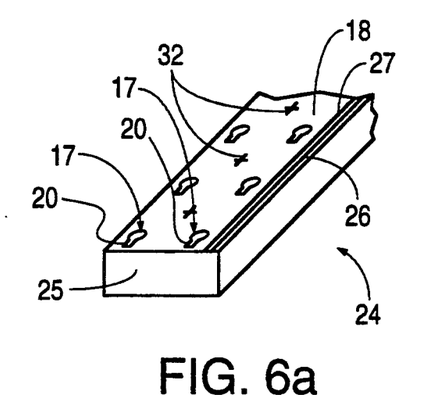
FIGS. 6a–6e illustrate the steps of a process in accordance with a first embodiment of the present invention.

The process of manufacturing an air bearing slider from a wafer having the transducers aligned in a column begins with the severing of a strip of material from the wafer, the strip having a width of approximately that of the desired end product air bearing slider. Referring to FIG. 6a, strip of material 24 from wafer 16 is illustrated in a highly enlarged view. Strip 24 includes a plurality of transducers 17 with pole portions 20 aligned toward the lower end of strip 24 as illustrated in FIG. 6a. In the preferred method, strip 24 is clamped in a fixture (not shown) to provide support to strip 24 during the processing of the sliders. After the completion of a slider and severing of the slider from the strip (FIG. 6e), the column (FIG. 6d) is then advanced to expose the next portion of the strip for producing the next slider by steps such as those illustrated in FIGS. 6a–6e. In accordance with the present invention, the throat height of the transducer for the air bearing slider may be established at the outset as the first step or, the rails for the air bearing slider may be defined and then the throat height adjusted to the appropriate specification. It may be preferable that the throat height of the to-be produced slider by established before the rails are defined. As is well known to those skilled in the art, the throat height is the critical distance between the back of the top pole of pole portions 20 and the to-be-defined air bearing surface for the air bearing slider. Referring to FIG. 6a, the material from end of portion 25 is removed by a lapping or polishing process to define the desired throat height for transducers 17. One of the methods to ascertain when sufficient material has been removed is to use what is referred to in the art as an electrical lapping guide. In the embodiment illustrated in FIG. 6a, an electrical lapping guide comprises a strip of material 26 which is formed on surface 18. By measuring the electrical characteristics of this strip as the lapping proceeds, an accurate determination of the throat height may be achieved. Typically an electrical contact by a probe, for example at point 27 may be made to perform electrical contact with strip 26. Additionally, an electronical lapping guide which is interposed between transducers 17, or the transducer themselves may be used. The magnetic and electrical properties of the magnetic transducers may be utilized in determining when the appropriate throat height has been achieved. Alternatively, optical techniques well known to those skilled in the art may be utilized to ascertain when the desired throat height has been achieved.

Figure 6B:
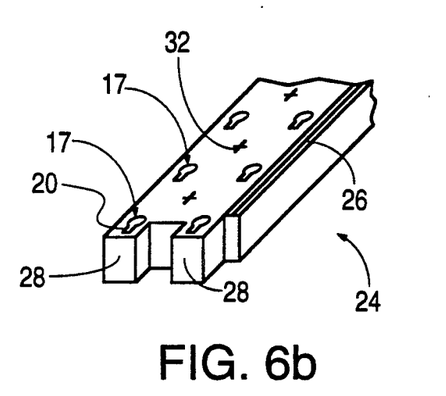

The second step of the process is illustrated in FIG. 6b where rails 28 for the air bearing slider are defined. This may be achieved by, for example, grinding or other processes in which the width of rails 28 are established. As stated above, the process of the present invention is illustrated herein using a two-rail slider, however tri-rail or other designs may be produced using the present invention. As illustrated in FIG. 6b, during the rail define step material to the right of the hand rail is removed to provide the desired width of the slider.

Figure 6C:
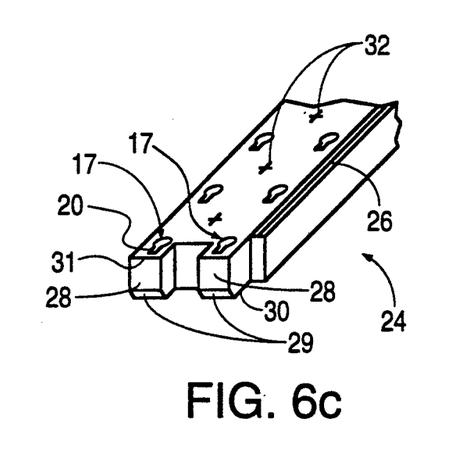

Referring to FIG. 6c, the next step in producing an air bearing slider comprises taper lapping to define taper 29 on rails 28. A suitable taper is provided to ensure appropriate takeoff of the air bearing slider from the surface of a magnetic recording media. Taper 29 extends from leading end 30 of the air bearing slider toward the trailing end 31 for a distance sufficient to impart the appropriate aerodynamic characteristics to the slider. Following the establishment of taper 29, edge blends on rails 28 may be added. In processing strip 24, it is important to ensure that the throat height of transducers 17 are the same for both of the transducers. One method of insuring appropriate alignment during the lapping process, and accordingly equal throat height, is to utilize optical alignment marks such as those indicated at 32 by a "+". The alignment marks are applied to surface 18 during the manufacture of the transducers. In some sliders a single transducer may be utilized, in which case alignment is not critical and can be hard tooled.

Figure 6D:
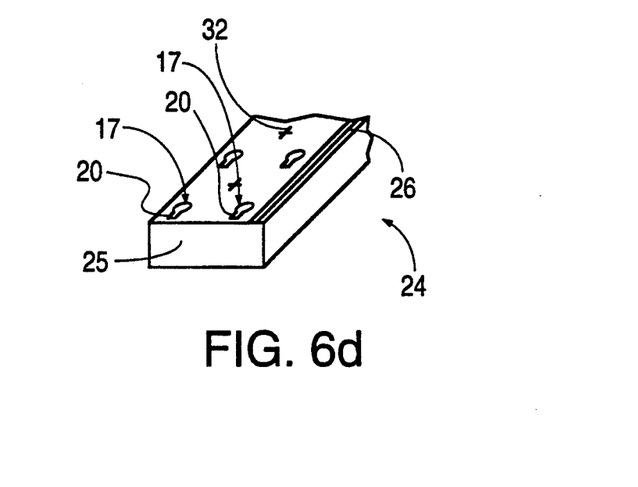
Figure 6E:
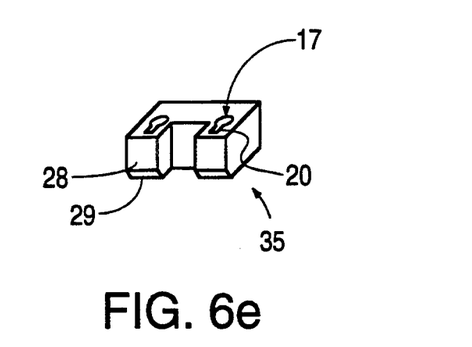

Following the above processes, the process for producing an air bearing slider is completed except for the severing the slider from strip 24. In FIGS. 6d and 6e, strip 24 and a severed air bearing slider are illustrated. As described above, when the electrical lapping guide is utilized along one of the edges of the strip 24, it is removed during the rail define step. The completed air bearing slider 35 is illustrated in FIG. 6e.

Figure 7A:
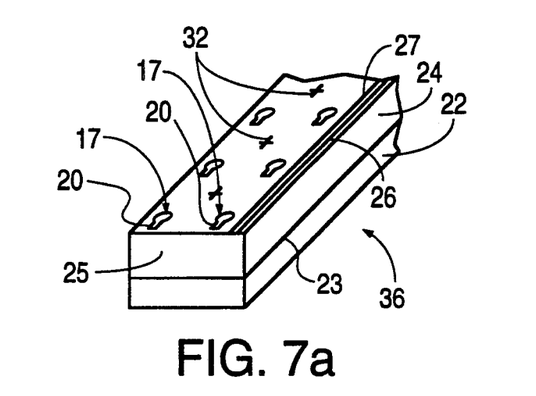
FIGS. 7a–7e illustrate the steps of another process in accordance with a second embodiment of the present invention.
Figure 7B:
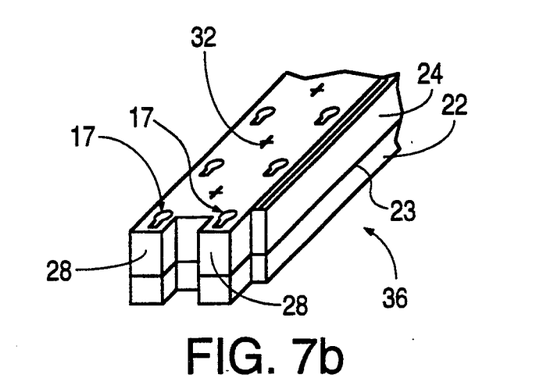
Figure 7C:
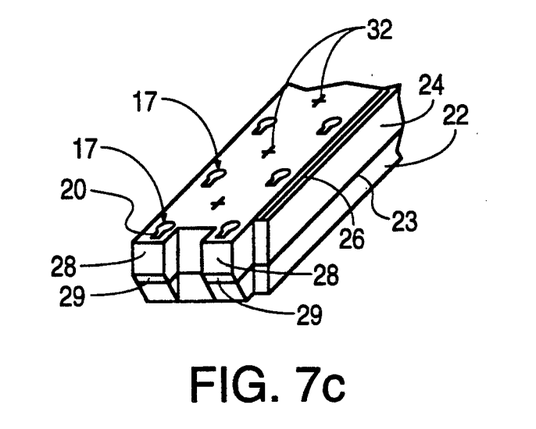
Figure 7D:
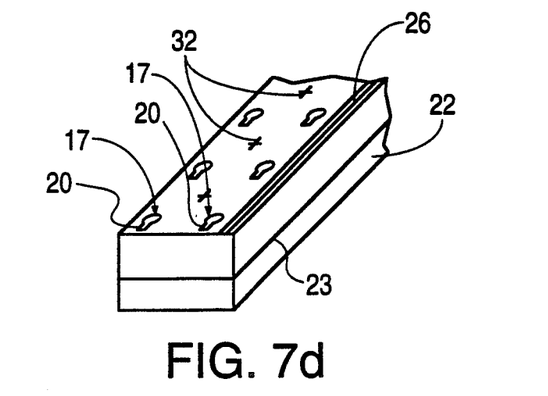
Figure 7E:
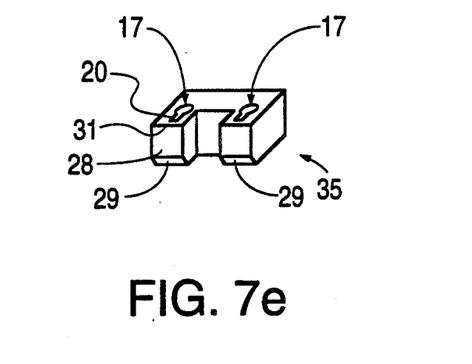

In accordance with the second embodiment of the present invention, a fixture may be attached to the wafer which includes the transducers to provide structural support for the body material of the wafer and therefor reduce the likelihood of breakage of the air bearing slider in its process of manufacture. It may be recalled with respect to the description of FIG. 6, that fixture 22 was affixed to body 19. In one embodiment, after fixture 22 is adhered to wafer 16, the wafer is sliced into columns, providing a combined strip 36 of body material 19 and fixture 22, as illustrated in FIG. 7a. Alternatively, the wafer may be sliced into columns and a fixture of suitable dimensions clamped to the underside of strip 24. Next, the combined strip 36 is lapped to provide appropriate throat height for transducers 17 adjacent to end portion 25 strip 24. Then following lapping for throat height, rail define is performed providing the structure illustrated in FIG. 7b. As in the case of the first embodiment, rail define may be performed before lapping or polishing for the throat height, however it maybe preferable to lap for throat height first. After the rails have been defined, taper lapping is performed to provide the appropriate taper 29 to the rails. FIG. 7c illustrates the combined substrate and body portion after the completion of the taper lap. After the taper lapping is performed, the end portion of the column is severed from the strip providing air bearing slider 35 as illustrated in FIG. 7e. In the embodiment described above, supporting substrate fixture was adhered to the bottom surface of wafer 16 and strips of the combined wafer and substrate were sliced into columns. Alternatively, columns of transducers may be severed from wafer 19 and a backing substrate applied on a column by column basis.

The foregoing describes the practice of the present invention with respect to several embodiments, however variations and modifications of the foregoing processes may be made without departing from the spirit and scope of the present invention. The invention is as set forth below in the claims.

We claim:

1. A process for producing an air bearing slider having a transducer element supported on said air bearing slider, said transducer element having a pole portion, said process comprising the steps of:
providing a strip of material having a longitudinal axis and having a plurality of transducer elements on a first surface of the strip of material with the pole portions of the transducer elements oriented parallel to said longitudinal axis;
processing said strip to define an air bearing slider having at least one transducer element adjacent to a surface of said air bearing slider.

2. A process according to claim 1, wherein said step of processing comprises:
lapping a second surface of said strip of material to define a throat height of the poles of a transducer element of an air bearing slider and removing portions of said material from said second surface of said strip of material to define rails for said slider.

3. A process according to claim 2, further comprising the step of taper lapping said rails after said step of defining said rails.

4. A process according to any of claims 1-3, further comprising the step of cutting through said strip of material to remove said air bearing slider from said strip of material.

5. A process according to claim 1, and wherein said step of processing comprises:
removing portions of said material from a second surface of said strip of material to define rails for an air bearing slider followed by the step of lapping said second surface of said strip of material to define a throat height of the poles of a transducer element on said air bearing slider.

6. A process according to claim 5, further comprising the step of taper lapping said rails.

7. A process according to any of claims 5-6, further comprising the steps of cutting through said strip of material to remove said air bearing slider from said strip of material.

8. A process for producing an air bearing slider having a transducer element supported on said air bearing slider, said transducer element having a pole portion, said process comprising the steps of:

providing a wafer having on a first surface a plurality of transducer elements aligned in columns;

affixing to a second surface of said wafer a fixture;

severing from said combined wafer and fixture a strip having a longitudinal axis and which includes a plurality of transducer elements whose pole portions are oriented parallel to said longitudinal axis; and processing said strip to define an air bearing slider having at least one transducer element adjacent to a surface of said air bearing slider.

9. A process according to claim 6, wherein said step of processing comprises:

lapping a third surface of said strip of material to define a throat height of the poles of a transducer element of an air bearing slider and removing portions of said material from said third surface of said strip of material to define rails for said slider.

10. A process according to claim 9, further comprising the step of taper lapping said rails after said step of defining said rails.

11. A process according to any of claims 8–10, further comprising the step of cutting through said strip to remove said air bearing slider from said strip.

12. A process according to claim 11, further comprising the step of removing the portion of the fixture from said air bearing slider.

13. A process according to claim 1, wherein said step of processing comprises the step of affixing to a second surface of said strip a fixture to provide structural support for said strip.

14. A process according to claim 13, wherein said step of processing comprises:

lapping a third surface of said strip of material to define a throat height of the poles of a transducer element of air bearing slider and removing portions of said material from said third surface of said strip of material to define rails for said slider.

15. A process according to claim 14, further comprising the step of taper lapping said rails after said step of defining said rails.

16. A process according to claim 13, wherein said step of processing comprises:

removing portions of said material from a third surface of said strip of material to define rails for an air bearing slider followed by the step of lapping said third surface of said strip of material to define a throat height of the poles of a transducer element on said air bearing slider.

17. A process according to claim 16, further comprising the step of taper lapping said rails.

18. A process according to any of claims 16–17, further comprising the step of cutting through said strip of material to remove said air bearing slider from said strip of material.

19. A process according to claim 18, further comprising the step of removing the portion of the fixture from the severed air bearing slider.

20. A process according to any of claims 8–10, wherein said step of affixing a fixture to said second surface of said wafer comprises clamping said fixture to said wafer.

21. A process according to any of claims 8–10, wherein said step of affixing a fixture to said second surface of said wafer comprises applying an adhesive to a surface of said fixture or to said second surface.

22. A process according to any of claims 13–17, wherein said step of affixing a fixture to said strip of material comprises clamping said fixture to said strip.

23. A process according to any of claims 13–17, wherein said step of affixing a fixture to said strip of material comprises applying an adhesive to a surface of said fixture or to said second surface.

24. A process according to any of claims 1–3 or 5, further comprising performing the step of providing a substrate having on a first surface a plurality of transducer elements aligned in a plurality of rows and columns, wherein at least one of the rows is of a length different than the length of at least one of the other rows, prior to performing the step of providing a strip of material having a plurality of transducer elements on a first surface of the strip of material.

25. A process according to claim 24, wherein said substrate comprises a circular wafer.

26. A process according to claim 24, wherein said step of providing a substrate having on a first surface a plurality of transducer elements aligned in a plurality of rows and columns further comprises the step of forming said rows of transducer elements using a plurality of fields.

* * * * *